Sept. 25, 1951 A. E. DRISSNER 2,569,093
CHUCKING MECHANISM
Filed May 4, 1948 3 Sheets-Sheet 1

INVENTOR.
Alfred E. Drissner
BY
Woodling and Krost
attnys

Sept. 25, 1951     A. E. DRISSNER     2,569,093
CHUCKING MECHANISM

Filed May 4, 1948                                3 Sheets-Sheet 2

Witness
Clyde H. Haynes

INVENTOR.
Alfred C. Drissner
BY Woodling and Krost
attnys.

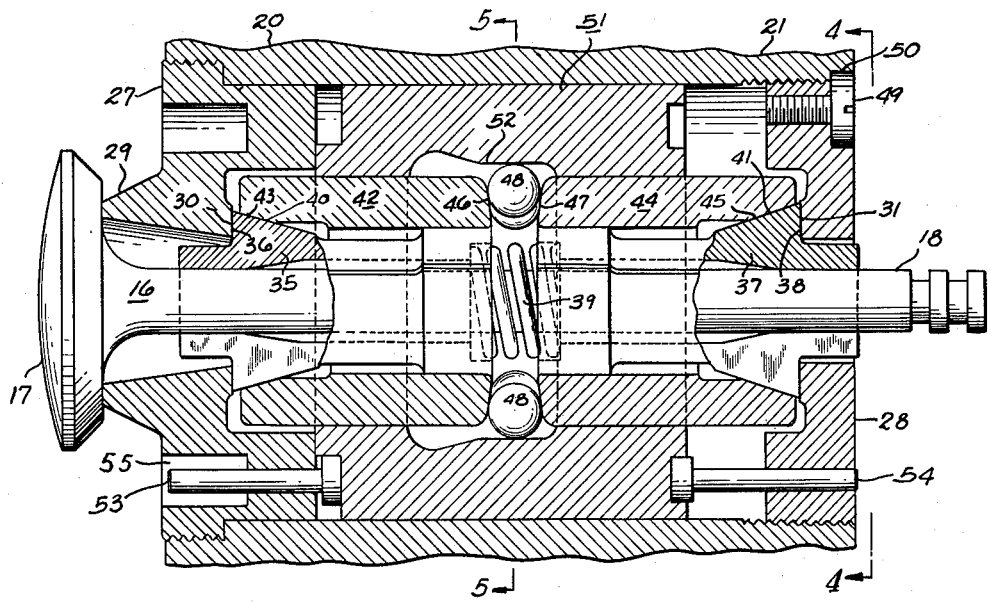
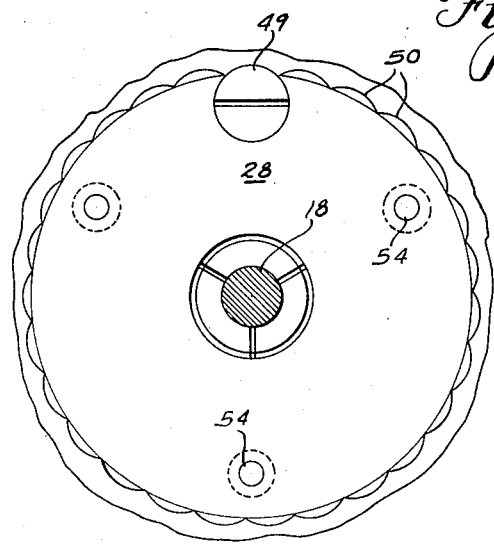 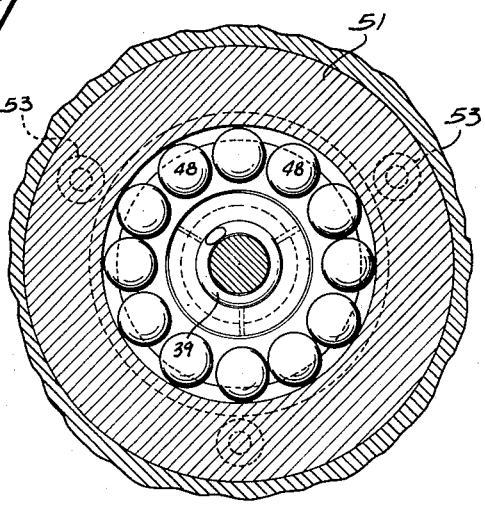

Patented Sept. 25, 1951

2,569,093

UNITED STATES PATENT OFFICE 2,569,093

CHUCKING MECHANISM

Alfred E. Drissner, Cleveland, Ohio, assignor to The National Acme Company, a corporation of Ohio Application May 4, 1948, Serial No. 25,033

7 Claims. (Cl. 279—56)

My invention relates in general to an improved chucking mechanism which will rotate the workpiece so that both ends may be machined simultaneously.

This application is a continuation in part of my former application entitled, "Valve Stem Chucking Mechanism" which was filed July 21, 1944, and bears Serial No. 546,039, now abandoned. As was stated in the original application, a gripping pressure of approximately 2800 pounds must be exerted upon each end of a valve stem by the chucking mechanism which rotated the valve for machining.

I have discovered that my improved chucking mechanism will grip the valve stem so that both ends thereof may be machined simultaneously. One of the major problems which had to be solved in designing the valve chucking mechanism was to provide a driven gear containing the chucking mechanism small enough so that both ends of the valve would stick out of the driven gear. Another problem which had to be solved was the time required for chucking the valve stem.

Therefore, an object of my invention is to provide a driven gear with a valve chucking mechanism small enough so that both ends of the valve stick out of the driven gear for simultaneous machining of both ends.

Another object of my invention is to provide a chucking mechanism which will grip both ends of the valve stem with equal gripping pressures.

Another object of my invention is to provide a driven gear with a chucking mechanism which may be operated to chuck the workpiece while the driven gear and chucking mechanism are rotating.

Another object of my invention is to provide a chucking mechanism with chucking collets which are restrained against axial movement and which are moved radially to grip the workpiece.

Another object of my invention is to provide a chucking mechanism with a pair of collets and means to regulate the distance between these collets, thus regulating the gripping diameter of each collet.

Other objects and a fuller understanding of my invention may be had by referring to the following description and claims, taken in conjunction with the accompanying drawings, in which:

Figure 3 is a fragmentary enlargement of the driven gear illustrating the valve gripped by the chucking mechanism;

Figure 4 is a view taken along the lines 4—4 of Figure 3; and

Figure 5 is a view taken along the lines 5—5 of Figure 3.

In my description and claims I refer to the manufacturing of valves. However, it is understood that my machine may easily be used to machine both ends of any rotatable workpiece, such for example as axles, and that by thus referring to the manufacturing of valves I do not limit the scope of my invention to valves.

Figure 1:
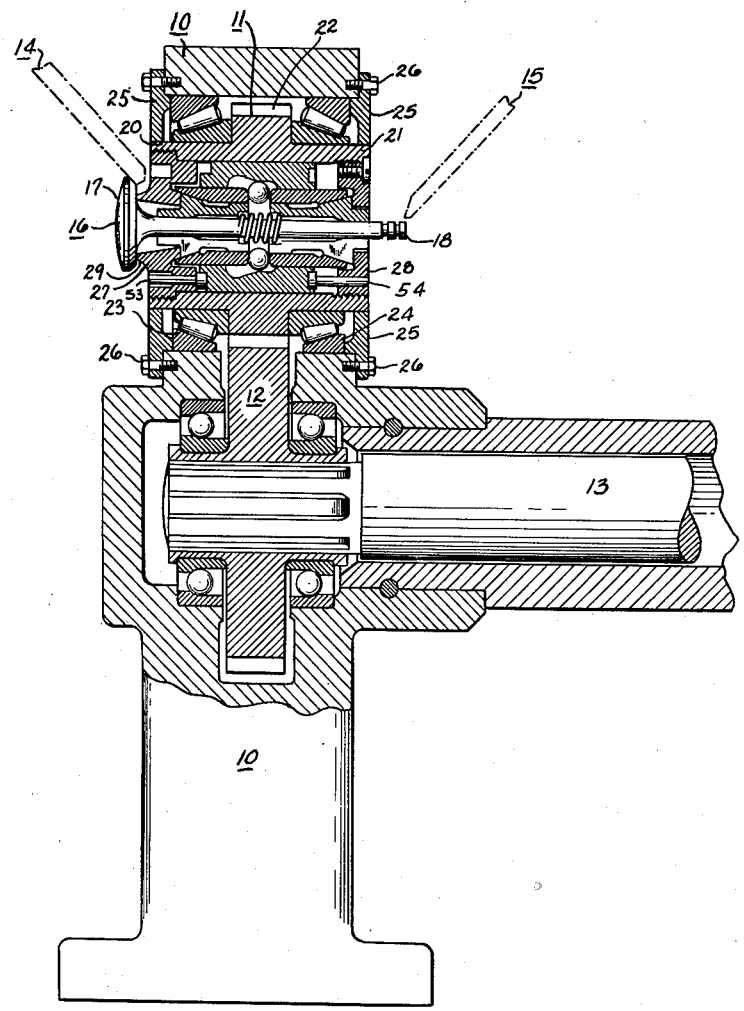
Figure 1 is a cross section of a single spindle machine illustrating a driven gear having a valve stem chuck therein with tools shown in phantom machining both ends of the valve.

In Figure 1, I illustrate my improved chucking mechanism as being incorporated in a driven gear 11 which is carried by a supporting structure 10 and rotated by a driving gear 12. Several driven gears 11 may be supported about the single center driving gear 12 to provide a multiple spindle machine so that one chucking mechanism may be reloaded with a workpiece while the workpiece in another chucking mechanism is being machined. The driving gear 12 is fastened to a drive shaft 13 which may be drivingly rotated by any suitable means, such as an electric motor. The driven gear 11 is rotatably supported so that it is always in mesh with the driving gear 12 and between tools 14 and 15 which are shown in phantom. The tool 14 is positioned to machine the head 17 of the valve 16, and the tool 15 is positioned to machine the end of the stem 18 of the valve 16.

Figure 2:
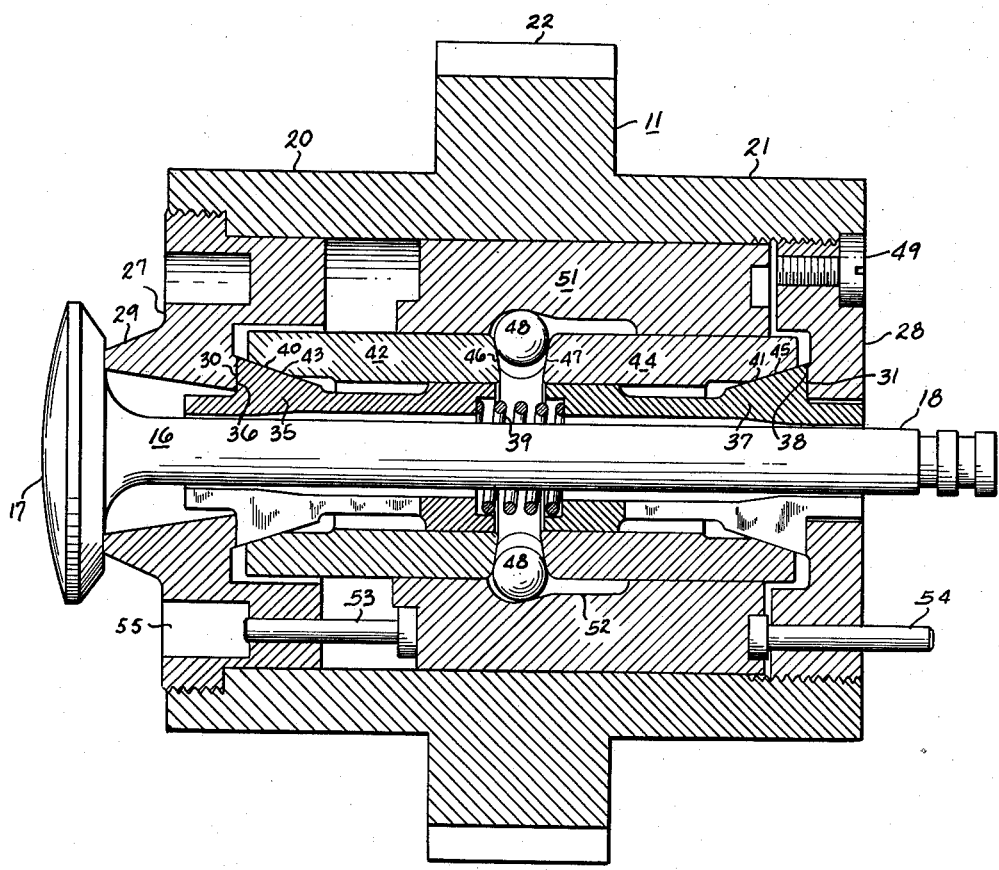
Figure 2 is an enlarged cross-sectional view of the driven gear illustrating the chucking mechanism in open position with a valve inserted therein.

The driven gear 11 carries the chucking mechanism which rotates the valve 16. The driven gear 11 as illustrated in Figures 1 and 2 has a length less than the length of the valve stem, and may be referred to as a housing for my chucking mechanism. This housing has a bearing portion 20 on one end thereof and a bearing portion 21 on the other end thereof, with gear teeth 22 disposed therebetween and extending radially from the housing to mesh with the teeth of the driving gear 12. A roller bearing race 23 encircles the bearing portion 20 and bearingly supports it in the supporting structure 10. Similarly, a roller bearing race 24 encircles the bearing portion 21 and bearingly supports it in the supporting structure 10, with the gear teeth 22 disposed between the roller bearing races 23 and 24. In my drawings I have illustrated the gear teeth 22, and thus the driven gear 11, as having a diameter smaller than the diameter of the roller bearing races 23 or 24. Plates 25 are fastened to each side of the supporting structure 10 by bolts 26. These plates 25 abut the roller bearing races 23 and 24 and hold them in correct spaced position in the supporting structure to prevent axial movement of the driven gear relative to the driving gear.

A cap 27 is threaded into the bearing portion 20 of the housing or driven gear 11, and a cap 28 is threaded into the bearing portion 21. The cap 27 has a projection 29 to engage the head of the valve being machined to prevent twisting of the head relative to the valve stem. On the inside of this cap 27 is an internal shoulder 30 disposed substantially at right angles to the axis of rotation of the driven gear. Similarly, an internal shoulder 31 is disposed on the inside of the cap 28.

A first chuck collet 35 is disposed within the housing and has a surface 36 to engage the internal shoulder 30 of the cap 27 which is threaded into the bearing portion 20. A second chuck collet 37 is also disposed within the housing and has a surface 38 to engage the internal shoulder 31 of the cap 28 which is threaded into the bearing portion 21. As is illustrated in Figure 2 of my drawings, these chuck collets 35 and 37 are urged apart and against their respective internal shoulders by a collet spring 39. One of the chuck collets grips one end of the valve stem, and the other of the chuck collets grips the other end of the valve stem, so that each end of the valve stem is chucked next adjacent the part of the valve which is being machined and with about 2800 pounds' chucking pressure. I have discovered that this gripping of both ends of the valve stem prevents twisting and deformation of the metallic structure of the stem.

The chuck collet 35 has a conical cam surface 40, and the chuck collet 37 has a conical cam surface 41. A first chuck sleeve 42 is slidably carried by the first chuck collet 35 and has a cam surface 43 to cooperate with the conical cam surface 40 of the chuck collet 35. A chuck sleeve 44 is similarly slidably carried by the second chuck collet 37 and has a cam surface 45 to cooperate with the cam surface 41 of the chuck collet 37. These chuck sleeves 42 and 44 are spaced apart with the chuck sleeve 42 having an end surface 46 and the chuck sleeve 44 having an end surface 47 facing the end surface 46.

As is illustrated in Figures 3 and 5 of my drawings, a plurality of balls 48 may be inserted or forced between these end surfaces 46 and 47 to slide the chuck sleeves 42 and 44 apart, thus causing the chuck collets 35 and 37 to grip both ends of the valve stem 18 or any other workpiece inserted therein. I have also discovered that I can control the gripping diameter of both chuck collets by turning the cap 28 into or out of the housing, and thereby increasing or decreasing the distance between the internal shoulder 30 on the cap 27 and the internal shoulder 31 on the cap 28. When the distance between the shoulders is increased the spring 39 will spread the chuck collets 35 and 37 further apart, and the spring tension in the chuck collets 35 and 37 will cause them to expand to a greater gripping diameter.

Since the end surfaces 46 and 47 of the respective chuck sleeves are always spaced apart and are disposed at an angle to each other, the wedging of the balls therebetween will cause the sleeves to spread apart and thereby cam the chuck collets radially into the workpiece or valve stem. It is thus seen that the chuck collets 35 and 37 grip the valve stem by being radially contracted onto the valve stem. As the chuck collets are radially contracted on the valve stem their axial spacing is controlled by the internal shoulders 30 and 31 so that the chuck collets will not tend to lengthen the valve stem.

I have provided the cap 28 with a lock screw 49, and the end of the bearing portion 21 with a plurality of recesses 50 which cooperate with the head of the lock screw 49 to lock the cap 28 into the bearing portion 21 after it has been threadably turned into the housing the correct distance to provide the desired spacing between the internal shoulders 30 and 31.

In Figures 2 and 3 of my drawings I best illustrate a spool which I have slidably inserted in the housing or driving gear 11. This spool 51 has an internal cam surface 52 which engages the balls 48 to force them between the end surfaces 46 and 47 of the chuck sleeves 42 and 44. The spool 51 is slidably mounted about the chuck sleeves and slides axially of the driven gear. The cam surface 52 is of larger radius on one end of the spool 51 than on the other end, so that when the spool 51 is slid to the open position as illustrated in Figure 2 the balls 48 are not forced between the chuck sleeves 42 and 44. However, when the spool 51 is slid to the closed position as illustrated in Figure 3, the cam surface 52 forces the balls 48 between the chuck sleeves 42 and 44, thus causing the chuck collets to grip the valve stem inserted therein. Since the spool 51 is entirely enclosed within the driven gear 11, I have provided a drive pin 53 carried by the cap 27 and a drive pin 54 carried by the cap 28, to enable me to slide the spool back and forth. Since the pin 53 has a length equal to the thickness of the cap 27, I have provided the cap with a recess 55 so that the pin 53 may be reciprocated without stopping the machine. The pin is always located within the outer surface of the cap 27 and thus will not become damaged by the tool 14.

I have discovered that just a few hundred pounds of pressure on these drive pins 53 and 54 will cause a gripping pressure of approximately 2800 pounds on the workpiece being chucked and machined. It is understood that when I refer to these gripping pressures I am referring to the pressures which I found in the machine which I have constructed for machining valves. However, it is understood that chucking mechanisms of various sizes may be constructed, and that these chucking mechanisms will produce many different gripping pressures on the workpiece.

Although my invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a chucking mechanism for a workpiece, a housing having a first internal shoulder on one end thereof, a cap carried by the other end of said housing and having a second internal shoulder spaced from the said first internal shoulder, a first chuck collet within said housing and abutting said first internal shoulder, a second chuck collet within said housing and abutting said second internal shoulder, each of said chuck collets having a cam surface, a first chuck sleeve engaging the cam surface of the first chuck collet, a second chuck sleeve engaging the cam surface of the second chuck collet and spaced from the first chuck sleeve, ball means within the housing and insertable between the chuck sleeves to move the same apart to cause the chuck collets to grip their respective ends of the workpiece, a spool shiftable in the housing and cammed to force the ball means between the chuck sleeves, a first pin slidably carried by said housing and engaging one end of the spool to shift the spool in one direction, and a second pin carried by the cap and engaging the opposite end of the spool to shift the same in the opposite direction.

2. A rotatable chucking device for rotating a workpiece for machining both ends thereof at the same time, said device comprising, a gear having opposite surfaces with a central cylindrical aperture extending therebetween, a cap on each side of said gear and thus in each end of said aperture, a pair of opposed chuck collets within said aperture and between said caps, each having an external, somewhat conical-shaped surface, chuck sleeves slidable on said collets and having opposed tapered end surfaces, said chuck sleeves having internal tapered surfaces engaging the somewhat conical-shaped surfaces of the chuck collets to radially contract the same onto a workpiece inserted therein, one cylindrical spool shiftable in the aperture of said gear and surrounding both of said chuck sleeves, said spool having a cam recess of variable depth on the inside thereof, wedge means in said recess within said spool and between the opposed tapered end surfaces of the chuck sleeves, and means extending outwardly through said caps for shifting said spool and thereby camming said wedge means between the chuck sleeves to radially contract the chuck collets.

3. A rotatable chucking device for rotating a workpiece for machining both ends thereof at the same time, said device comprising, a gear having opposite surfaces with a central cylindrical aperture extending therebetween, a cap on each side of said gear and thus in each end of said aperture, a pair of opposed chuck collets within said aperture and between said caps, each having an external, somewhat conical-shaped surface, chuck sleeves slidable on said collets and having opposed tapered end surfaces, said chuck sleeves having internal tapered surfaces engaging the somewhat conical-shaped surfaces of the chuck collets to radially contract the same onto a workpiece inserted therein, one cylindrical spool shiftable in the aperture of said gear and surrounding both of said chuck sleeves, said spool having a cam recess of variable depth on the inside thereof, a plurality of balls in said recess within said spool and between the opposed tapered end surfaces of the chuck sleeves, and means extending outwardly through said caps for shifting said spool and thereby camming said plurality of balls between the chuck sleeves to radially contract the chuck collets.

4. In a chucking mechanism for a workpiece, a housing having a first internal shoulder and a second internal shoulder spaced from the first internal shoulder, a first chuck collet within said housing and abutting said first internal shoulder, a second chuck collet within said housing and abutting said second internal shoulder, each of said chuck collets having a cam surface, a first chuck sleeve engaging the cam surface of the first chuck collet, a second chuck sleeve engaging the cam surface of the second chuck collet and spaced from the first chuck sleeve, wedge means within the housing and insertable between the chuck sleeves to move the same apart to cause the chuck collets to grip their respective ends of the workpiece, a spool shiftable in the housing and cammed to force the wedge means between the chuck sleeves, first means carried by said housing and engaging one end of the spool to shift the spool in one direction, and second means carried by the housing and engaging the opposite end of the spool to shift the same in the opposite direction.

5. A rotatable chucking device for rotating a workpiece for machining both ends thereof at the same time, said device comprising, a supporting member having opposite surfaces with an aperture extending therebetween, a cap member on each side of said supporting member and thus in each end of said aperture, a pair of opposed chuck collets within said aperture and between said cap members, each having an external cam surface, chuck sleeves slidable on said collets and having opposed tapered end surfaces, said chuck sleeves having internal cam surfaces engaging the external cam surfaces of the chuck collets to radially contract the same onto a workpiece inserted therein, one spool shiftable in the aperture of said supporting member and surrounding both of said chuck sleeves, said spool having cam recess means of variable depth on the inside thereof, wedge means in said recess means within said spool and between the opposed tapered end surfaces of the chuck sleeves, and spool shifting means extending outwardly through at least one of said members for shifting said spool and thereby camming said wedge means between the chuck sleeves to radially contract the chuck collets.

6. In a chucking mechanism for a workpiece, a housing having a first internal shoulder and a second internal shoulder spaced from the first internal shoulder, a first chuck collet within said housing and abutting said first internal shoulder, a second chuck collet within said housing and abutting said second internal shoulder, each of said chuck collets having a cam surface, a first chuck sleeve engaging the cam surface of the first chuck collet, a second chuck sleeve engaging the cam surface of the second chuck collet and spaced from the first chuck sleeve, wedge means within the housing and insertable between the chuck sleeves to move the same apart to cause the chuck collets to grip their respective ends of the workpiece, a spool shiftable in the housing and cammed to force the wedge means between the chuck sleeves, and spool shifting means extending outwardly through said housing for shifting said spool and thereby camming said wedge means between the chuck sleeves to radially contract the chuck collets.

7. A rotatable chucking device for rotating a workpiece for machining both ends thereof at the same time, said device comprising, a supporting member having opposite surfaces with an aperture extending therebetween, a cap member on each side of said supporting member and thus in each end of said aperture, a pair of opposed chuck collets within said aperture and between said cap members, each having an external tapered surface, chuck sleeves slidable on said collets and having opposed tapered end surfaces, said chuck sleeves having internal tapered surfaces engaging the external tapered surfaces of the chuck collets to radially contract the same onto a workpiece inserted therein, one spool shiftable in the aperture of said supporting member and surrounding both of said chuck sleeves, said spool having cam recess means of variable depth on the inside thereof, wedge means in said recess means within said spool and between the opposed tapered end surfaces of the chuck sleeves, and spool shifting means extending outwardly through at least one of said members for shifting said spool and thereby camming said wedge means between the chuck sleeves to radially contract the chuck collets.

ALFRED E. DRISSNER.

REFERENCES CITED

The following references are of record in the file of this patent:

UNITED STATES PATENTS

| Number | Name | Date |
| --- | --- | --- |
| 1,272,784 | Ennis | July 16, 1918 |
| 1,402,720 | Bartlett et al. | Jan. 3, 1922 |
| 1,741,734 | Pannwitz | Dec. 31, 1929 |
| 1,747,657 | Avilla | Feb. 18, 1930 |
| 2,372,592 | Lovely | Mar. 27, 1945 |

FOREIGN PATENTS

| Number | Country | Date |
| --- | --- | --- |
| 91,180 | Switzerland | of 1921 |
| 170,957 | Germany | of 1906 |
| 208,396 | Switzerland | of 1940 |
| 434,583 | Germany | of 1926 |